United States Patent [19]

Fisher et al.

[11] 4,401,289

[45] Aug. 30, 1983

[54] ADJUSTABLE MIRROR STABILIZING MOUNTING

[75] Inventors: Robert J. Fisher, Livonia, Mich.; Arthur C. Jaworowicz, Jackson, Tenn.; John M. Lyle, Germantown, Tenn.; Jerry W. Sellers, Lexington, Tenn.; Gary R. Steed, Medon, Tenn.

[73] Assignee: Harman Automotive, Inc., Detroit, Mich.

[21] Appl. No.: 245,913

[22] Filed: Mar. 20, 1981

[51] Int. Cl.$^3$ .............................................. B60R 1/02
[52] U.S. Cl. ................................... 248/483; 403/90
[58] Field of Search ............... 248/181, 288.5, 288.3, 248/483, 659, 663, 481; 403/90; 74/501 M

[56] References Cited

U.S. PATENT DOCUMENTS

| | | | |
|---|---|---|---|
| 2,500,784 | 4/1950 | Anderson | 287/23 |
| 2,533,475 | 12/1950 | Koonter | 248/483 X |
| 3,225,621 | 12/1965 | Augunas | |
| 3,286,545 | 11/1966 | Malachowski | 74/501 |
| 3,442,151 | 5/1969 | Brawner | 74/501 |
| 3,512,746 | 5/1970 | Vitaloni et al. | 248/483 |
| 3,638,899 | 2/1972 | Bonisch et al. | 248/483 |
| 3,800,619 | 4/1974 | McIntyre | 74/501 |
| 4,157,876 | 6/1979 | DiGiulio | 403/90 |
| 4,268,120 | 5/1981 | Jitsumori | 248/483 |

FOREIGN PATENT DOCUMENTS

| | | | |
|---|---|---|---|
| 932274 | 7/1963 | United Kingdom | 248/481 |
| 1190507 | 5/1970 | United Kingdom | |

Primary Examiner—James T. McCall
Assistant Examiner—David Lee Talbott
Attorney, Agent, or Firm—Miller, Morriss & Pappas

[57] ABSTRACT

An adjustable mirror stabilizing mounting useful in handset, power, and remote control automotive mirrors in which the fixed side of the mounting projects from the mirror housing to support spherically concentric nested surfaces sandwiching the movable element therebetween and including keying means and trunnion means in the sector retainer for providing stability of adjustable support with limited movement. A selected anti-friction pad is provided between certain of the spherical surfaces and assembly is by a compression loading of the spring element.

6 Claims, 6 Drawing Figures

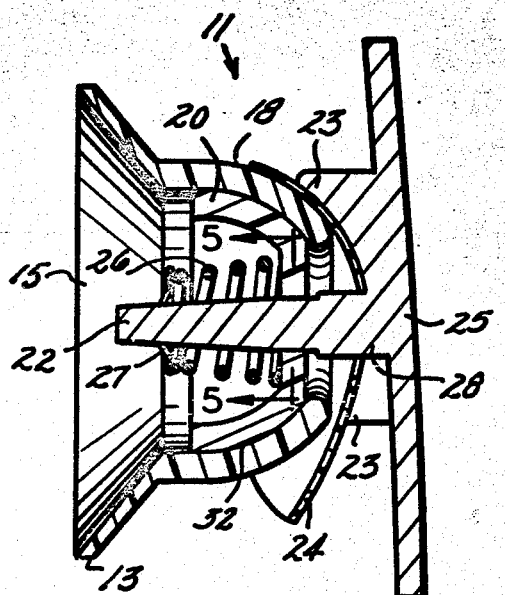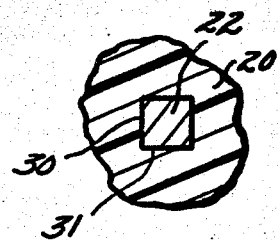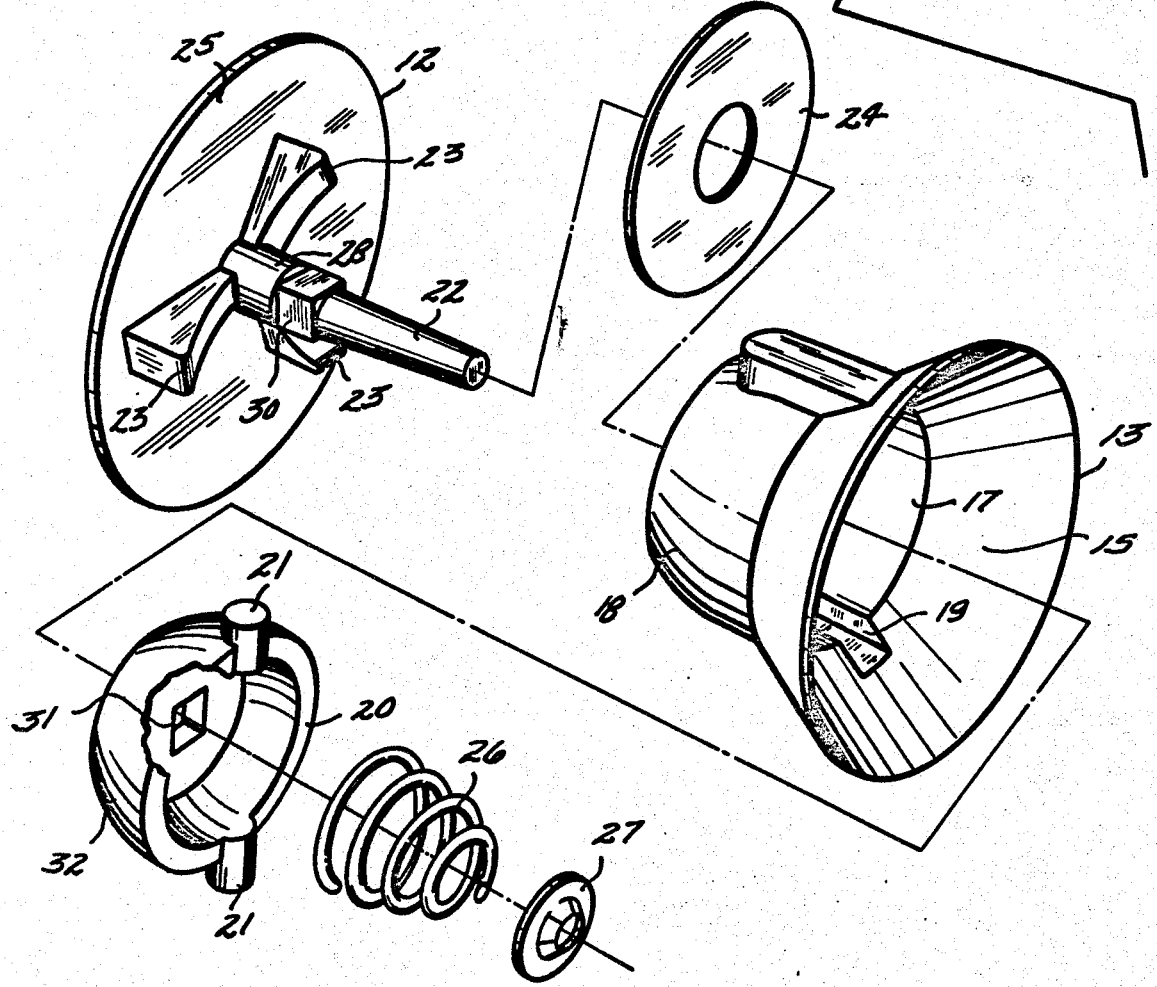

ADJUSTABLE MIRROR STABILIZING MOUNTING

The present invention is directed to a new and improved adjustable mirror stabilizing mounting as is used in automobile mirrors, for example, where the mirror glass and its immediate holding case requires limited universal movement by hand, by power or by remote means.

The support of an automotive mirror must be sufficiently stabilized to resist creeping out of adjustment, to resist vibrational movement, to provide for wear compensation, to avoid rotation of the mirror about a support axis while providing limited universal adjustment around a point on the axis, and to provide ample friction to retain its setting against normal automotive acceleration, deceleration and travel over relatively uneven terrain in accord with operating requirements.

Prior art support systems for mirror supports have involved ball and socket arrangements; spring compression seats; and stabilizing systems of radially extending arms and plural cushioned pins and each providing complications for construction and assembly. The present invention obviates such constructions and vastly simplifies the manufacture and assembly while providing solutions to the need for functioning stability in an automobile environment. Examples of the prior art in handset and remote control mirror assemblies are represented in the U.S. Pat. Nos. 2,533,475 to C. G. Koonter; 2,500,784 to J. W. Anderson; 3,442,151 to F. A. Brawner, et al; 3,225,621 to A. G. Augunas; 3,286,545 to H. J. Malachowski; 3,800,619 to McIntyre and British Letters Patent No. 1,190,507 to Daimler-Benz Aktiengesellschaft.

The closest prior art provides a mounting post which changes in axial position and impinging on a bracket which includes an outboard or eccentric-reaching stabilizing arm requiring ball connection to the mirror case. Then the bracket itself is secured to the mirror housing as by screws or other fasteners. This arrangement is complex and includes assembly difficulty with access holes through the mirror case to permit attachment of the bracket to the mirror housing.

Accordingly, the main object of the invention is to provide a substantially improved mirror mounting useful in handset power and remote control rearview mirrors as used in automobiles in which stabilization of the mirror case and mirror is achieved at the post or axis passing through the center of concentric spherical surfaces under an improved compression relationship.

Another object is to achieve an assembly as set forth which is relatively easy to assemble from the mirror case and which is repetitively accurate at assembly with uniform constant lineal application of spring pressure and which requires no auxiliary arms, levers or resilient bushings to guard against rotational tendencies in the finished mirror. As will be appreciated, the amount of compression between the spherical surfaces can be varied as desired by particular usages and the limits of movement are easily established by the selection of post to opening relationship. Further, the present construction results in a completely linear application of spring pressure which is highly desirable to achieve repetitive accuracy of the selected compression at assembly and under wear conditions during use. The device is thus wear compensating under long usage as a universal joint assembly.

Other objects including economy, amenability to die casting and accurate forming, together with stark simplicity and minimization of parts, will be appreciated as the description proceeds.

GENERAL DESCRIPTION

In general, the present invention is a mounting structure for adjustable rearview mirrors requiring limited universal adjustment by hand, by power, or by remote control means. In the present structure a glass or mirror case is provided which, besides grasping or holding the mirror glass, includes a depression on an axis generally transverse to the mirror glass surface. This provides spherical inner and outer concavo-convex surfaces which surround an opening on the axis. The depression also includes slots in spaced-apart parallel relation to the axis which truncate the spherical surfaces. A spherical surfaced sector retainer is provided which nests or mates with the inner spherical surface of the case and trunnions extend from the spherical surface on an axis transverse to the axis through the case and into the slots of the case. Key means are provided at the opening on the axis of the spherical sector retainer and through the wall thereof. A stud is also provided which is integral or otherwise fixed to the mirror housing or base. The stud extends upwardly or outwardly on the axis and through the case and the sector retainer. At the lower end of the stud is a cylindrical surface forming a limiting stop against movement of the mirror case at the opening through the case. Above the cylindrical stop surface is a key surface mating with the key opening in the sector retainer when the sector retainer is trunnion mounted in the case and in spherical concentric contact with the concave or inner spherical surface of the case. This prevents rotation of the sector retainer around the axis formed by the stud or post. Clustered about the stud is a spherical support surface integral with the stud and preferably a part of the mirror housing. This spherical support matches the outer spherical or convex surface of the mirror case so that the case is universally adjustable in concentric relation about a point established by the center of the nested spherical surfaces in a wear compensating relation where the spherical surfaces are all engaged and where the extent of adjusting movement is limited by the stud to the perimeter of the opening in the case. As will be appreciated, the axis of the trunnions at intersection of the stud axis determines the center for limited universal movement of the case. A lineal acting spring under compression is over the stud and presses against the sector retainer urging the glass case convex or outer spherical surface into engagement with the spherical support surface surrounding the stud and urging the sector retainer into firm, non-rotating keyed relation to the stud. The spring is supported as by a fastener selectively pressing on the spring and on the end of the stud. Assembly is repetitively and accurately achieved by gauging the spring pressure and fixing the spring at that pressure thereby compensating for production variances in spring characteristics. The mounting assembly is simple, secure and achieved through from mirror case side with the concentricity of the spherical surfaces assuring wear compensation and precision with consequent smooth movement. The mirror case and the mirror housing provide the movable and fixed supports, the latter in the spherical support surface and the stud which it surrounds. Sandwiched between the convex outer spherical surface of the mirror case and the spherical support surface is selectively located an annular disc which adjusts and provides selected lubricity at the spherical interphases.

IN THE DRAWINGS

FIG. 4 is a cross-section elevation view of the structure shown in FIG. 2 on the line 4—4 thereof and indicating the anti-friction spherical support surface journalling of the mirror back element against the mirror case or housing.

FIG. 5 is a fragmental section view taken on line 5—5 of FIG. 4 and indicating the keyed relation between the spherical sector retainer and the stud extension fixed to the mirror housing thereby preventing rotation of the spherical retainer in respect to the mirror housing and the stud.

FIG. 6 is an exploded perspective view of the elements comprising a preferred embodiment of the concentric stabilizing mounting of the present invention and indicating the simplicity of the elements, their concentric nesting and ease of assembly.

SPECIFIC DESCRIPTION

Figure 1:
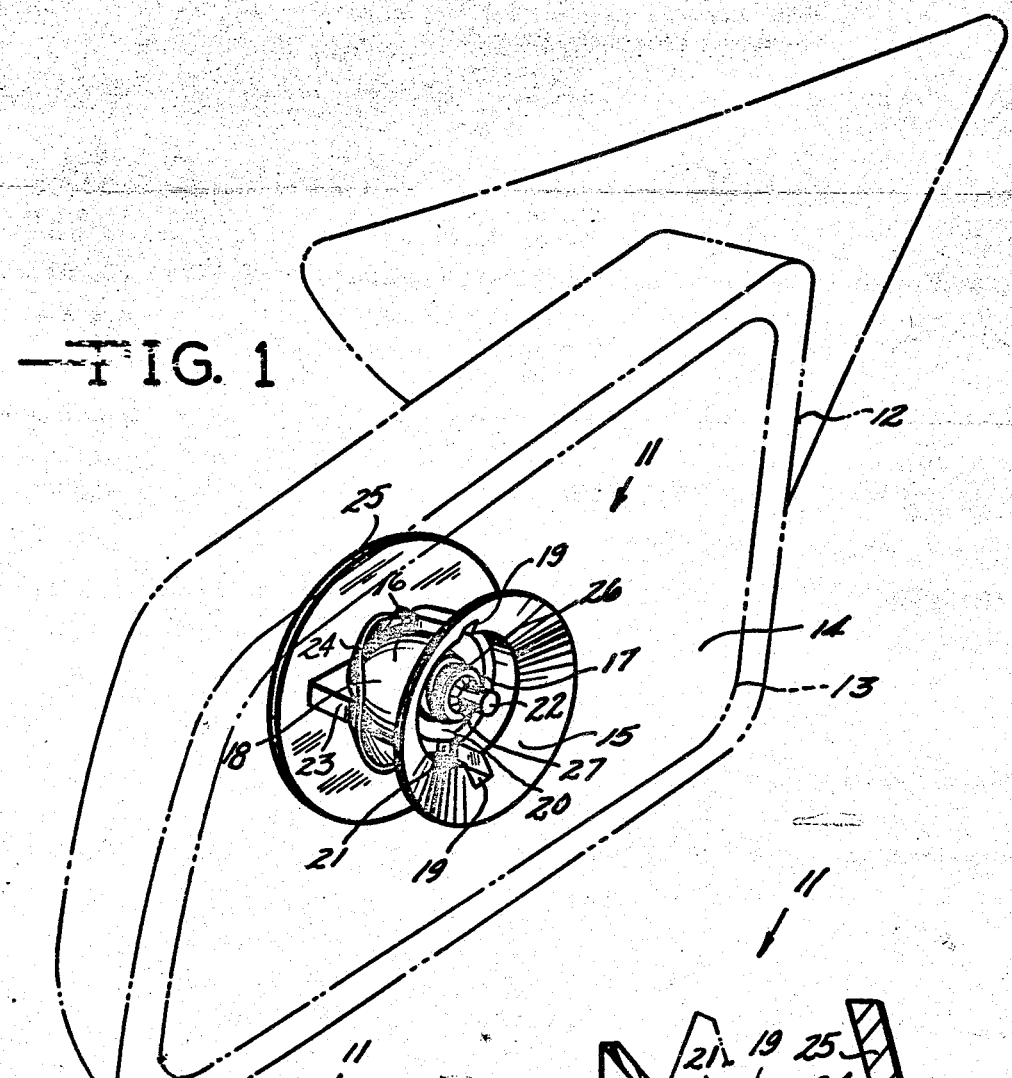
FIG. 1 is a perspective view of a device having limited stabilized universal movement in accord with the present invention is assembled operative relation in a mirror housing and secured to the fixed support and secured to the mirror back on the movable side, the mirror housing and the mirror back being indicated in phantom line.

Referring to the drawings and firstly to the FIG. 1 thereof, a mounting structure 11 in accord with the present invention is indicated in assembled relation inside the mirror housing 12 and mirror case 13. The mirror housing 12 and case 13 are in phantom line and the housing 12 is usually secured to some part of an automobile structure (as to a door, not shown, or above the head of a driver) so that the mirror 14 within the case 13 allows the driver to observe rearwardly. The mirror case 13 may be made of molded plastic or other suitable material and in accord with the present invention the central portion of the mirror case 13 includes a depression 15 on an axis generally normal to the surface of the glass 14. Preferably this depression 15 is integrally formed with the case 13 and includes a lower concavo-convex surface 16 providing inner and outer concentric spherical surfaces 17 and 18, respectively. Trunnion slots 19 are provided in the depression 15 of the case 13 and, as will be seen, the slots 19 flank the transverse axis through the case 13 and are parallel to that axis. The case 13 must be limitedly adjustable in the fixed housing 12.

A spherical surfaced sector retainer element 20 having trunnion elements 21 is insertable in the depression 15 and the spherical outer surface of the sector retainer 20 bears against the inner (concavo) surface of the depression 15 of the case 13 and the integral trunnions 21 extend into the trunnion slots 19. As will be seen, the sector retainer 20 has an axial opening therethrough and means keying the retainer 20 to the stud 22. The stud 22 is fixed in the housing 12 and passes through the opening in the bottom of the depression 15 in the mirror case 13 and through the sector retainer 20 and is keyed thereto. A spherical surface in the form of plural fingers 23 provides an outer support for the case 13 acting against the outer (convex) surface 18. An annular disc 24 of friction adjusting material is imposed between the housing fixed surface of fingers 23 and the mating surface 18. This provides suitable lubricity and selected journalling. The base 25 is cut from the housing 12 and in other respects provides fixed connection for the fingers 23 and the stud 20. The compression spring 26 is over the post or stud 22 and bears against the sector retainer and its compression is gauged by the driven fastener 27 of the lineal driver type. This assures proper pressure and assures, with the substantial lineal application of spring pressure over extended use, that the pressure remains relatively constant.

Figure 2:
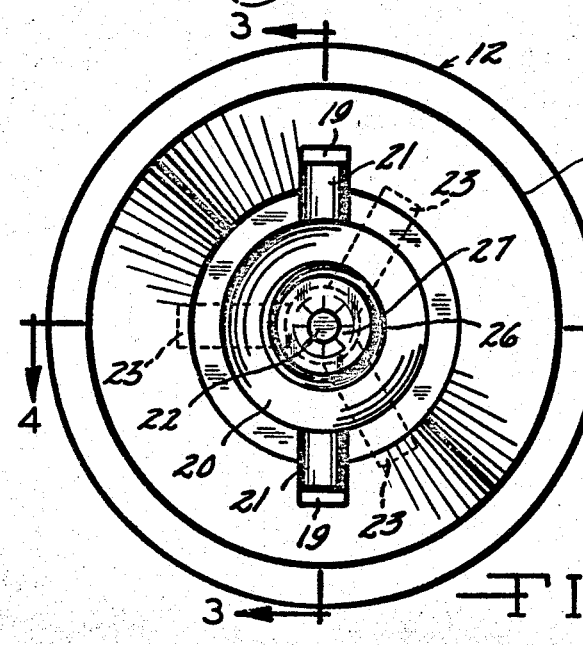
FIG. 2 is a top view looking down the axis of the stabilizing mounting of the present invention.

In FIG. 2 the concentric nesting of the spherical surfaces at 23, 18(convex), 17(concavo), and the sector retainer 20 is best appreciated. The clustered fingers 23 are apparent and generate the fixed spherical support. As thus assembled, the stud 22 and base 25 are fixed with the housing 12 and the attached sector retainer 20 is fixed thereto having linear movement only on the stud 22 against the compression of the spring 26. Appropriately nested, the axis of the trunnions 21 through the axis of the stud through the retainer 20 establishes the adjusting center for the mirror case 13.

Figure 3:
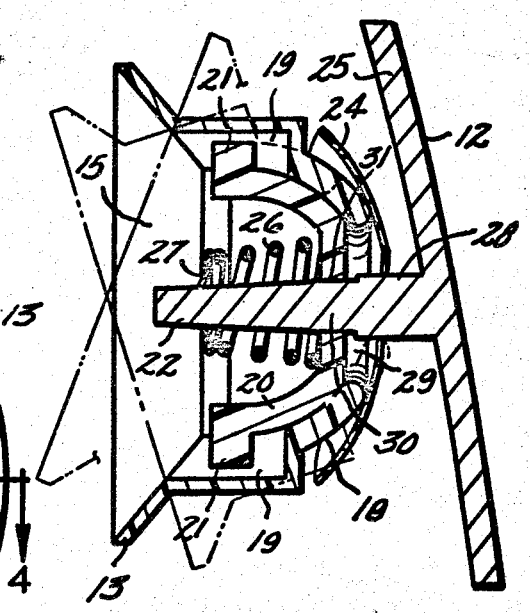
FIG. 3 is a cross section elevation view of the structure shown in FIG. 2 and on the line 3—3 thereof and indicating the arcuate movement of the mirror back or glass case concentric about the spherical surfaced sector retainers.

In FIG. 3 the character of the stud 22 is best understood, fixed to the base 25 and housing 12 and having a lower cylindrical portion 28 of a size selected to act as a travel stop against the movement of the mirror case 13 at engagement against the perimeter lip of the opening 29. Next adjacent the cylindrical part 28 is the out-of-round (square) shank portion 30 mating to key with the opening 31 in the sector retainer 20. The trunnions 21 of the retainer 20 extend into the slots 19 in the case 13. This permits the retainer 20 to achieve its concentric nesting while providing controlled journalling, by fit, of limited universal movement of the case 13 and in prevention of undesired rotation about the axis of the stud 22 or the depression 15. In phantom line, the limit of movement of the glass case 13 is indicated. The spring 26 placed over the stud 22 and secured the reupon by the fastener 27 provides accurate lineal compression for long life and wear compensation. The annular disc 24 is shown in deformed relation between the housing fingers 23 and the outer spherical surface 18 of the case 13.

FIG. 4 provides a better example of the spherical contact of fingers 23 to surface 18 through the annular disc 24.

FIG. 5 reveals the keying of the element 20 to the out-of-round shank 30 of the stud 22 in preventing rotation around the stud while allowing axial movement on the stud 22 for suitable nesting at assembly compression.

FIG. 6 illustrates the simplicity and structural relationship of the mounting 11 where the housing 12 provides the base 25 for the stud 22 with cylindrical stop 28 and key surface 30 and with the clustered fingers 23 providing a housing, fixed spherical support. This is precision molded in the housing 12 as by die casting or injection molding. The ring or annular disc 24 is slipped over the stud. Then the mirror case 13 (precision molded as by plastic injection molding) is positioned over the stud and the convex surface 18 formed in the bottom of the depression 15 is engaged over the disc 24 and against the finger 23. The sector retainer 20 is inserted in the concave surface 17 so that there is a spherical engagement between the surfaces 17 and 32 (of element 20) when the trunnions 21 are inserted in their slots 19. The completion of the assembly occurs upon application of the spring 26 secured by the fastener 27 at a selected gauged compression assuring repetitive uniformity of spring pressure and minimizing vibrational differences in mirror construction. Minimum parts are required and the case 13 is then closed by attachment of mirror glass. An improved performance stabilized mirror mounting is the result of this construction and useful in handset, power, or remote actuation automobile installations. The sector retainer 20 and mirror case 13 may be fabricated from selected, dimensionally stable and weather resistant precision moldable materials such as plastic or metal.

Having thus described my invention and a preferred embodiment thereof, those skilled in the art will perceive improvements, changes and modifications therein and such improvements, modifications and changes are intended to be included herein, limited only by the scope of my hereinafter appended claims.

I claim:

1. An adjustable mirror stabilizing mounting comprising:
    a glass case having inner and outer spherical concentric surfaces surrounding an opening on an axis through the center of said spherical surfaces and said case having trunnion slots flanking the axis of said opening;
    a spherical sector retainer, said outer spherical sector mating with said inner spherical concentric surface of said case and having transversely extending trunnions relatively movable in said slots and said spherical sector retainer keyed against rotation;
    a stud through said case and said spherical retainer keyed to said spherical retainer;
    a spherical support surface on the axis of said stud engaging said outer spherical surface of said glass case; and
    lineally acting spring means supported on said stud pressing said spherical sector retainer into keyed relation on urging said glass case into firm limitedly movable engagement with said spherical support surface.

2. An adjustable mirror stabilizing mounting comprising:
    a fixed mirror support base;
    a stud extending transversely from said support base and said stud including a cylindrical shoulder portion adjacent said base and an out-of-round shank portion adjacent said cylindrical shoulder and a coaxial extension of said shoulder portion;
    a spherical support surface surrounding said stud and arising from said base in coordinate position for support of a mating spherical surface;
    a movable mirror glass case adapted to hold a mirror glass and said case having a generally centrally located depression arising axially from a centrally located opening and said depression including an inner and outer spherical surface surrounding said opening and said depression including trunnion support slots;
    a spherical sector retainer element having a spherical section lower surface surrounding an opening configured as said out-of-round shank portion of said stud and said spherical sector retainer having integral trunnions projecting therefrom and guideably supported in said trunnion slots of said mirror glass case;
    a spring concentrically over said stud in shouldering engagement against said retainer around said opening; and
    a spring retainer element over said stud and bearing against said spring and set at a selected spring loading whereby said spring is linearly loaded and urges said spherical retainer over said out-of-round shank portion of said stud compresses said spherical outer surface of said glass case against said tip portions of said fingers and securing said glass case against rotation on its axis while permitting limited universal movement of said glass case.

3. In the combination of claim 2 wherein an anti-friction surface element is interposed between said spherical support surface and said outer spherical glass case.

4. In the combination of claim 2 wherein said axial opening in said mirror case is sized to engage said stud upon limited universal adjustment of said case on said spherical support surface.

5. In the combination of claim 2 wherein said spherical support surface is defined by plural fingers arising from said base and concentrically around stud.

6. The combination of claim 5 in which the spherical support surface is established at least by the tips of said plural fingers.

* * * * *

UNITED STATES PATENT AND TRADEMARK OFFICE
CERTIFICATE OF CORRECTION

PATENT NO. : 4,401,289
DATED : 1983 August 30
INVENTOR(S) : Robert J. Fisher, et al It is certified that error appears in the above-identified patent and that said Letters Patent is hereby corrected as shown below:

Column 3, line 7, change "is" to read --- in ---

Column 4, line 43, change "the reupon" to read --- thereupon ---

Column 5, line 16, change "my" to read --- our ---

Column 5, line 21, change "my" to read --- our ---

Column 5, line 22, change "I" to read --- We ---

Signed and Sealed this

Fifteenth Day of November 1983

[SEAL]

Attest:

Attesting Officer

GERALD J. MOSSINGHOFF

Commissioner of Patents and Trademarks